Figure 1:
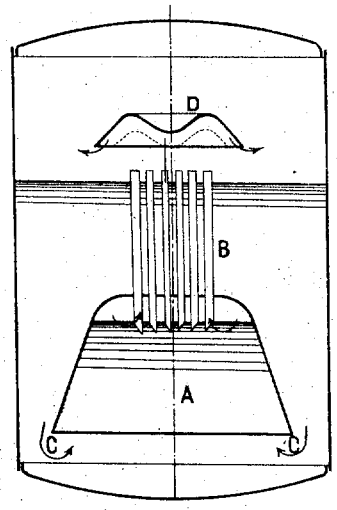

P. DUBIAU.

STEAM GENERATOR.

No. 11,558. Reissued July 21, 1896.

Witnesses
Thos. A. Gunn
Robt Everett

Inventor
Paul Dubiau.
By James L. Norris.
Atty

P. DUBIAU.

STEAM GENERATOR.

No. 11,558. Reissued July 21, 1896.

Witnesses
Thos. A. Grun
Robert Gourlett

Inventor
Paul Dubiau.
By James L. Norris.
Atty.

3 Sheets—Sheet 3.

P. DUBIAU.

STEAM GENERATOR.

No. 11,558. Reissued July 21, 1896.

Witnesses
Thos. A. Grun
Robt Everett

Inventor.
Paul Dubiau.
By James L. Norris
Atty

UNITED STATES PATENT OFFICE.

PAUL DUBIAU, OF MARSEILLES, FRANCE.

STEAM-GENERATOR.

SPECIFICATION forming part of Reissued Letters Patent No. 11,558, dated July 21, 1896.

Original No. 522,517, dated July 3, 1894. Application for reissue filed June 19, 1896. Serial No. 596,220. Patented in France January 14, 1893, No. 227,055, and in Belgium July 15, 1893, No. 105,555.

*To all whom it may concern:*

Be it known that I, PAUL DUBIAU, a citizen of France, and a resident of Marseilles, in the Department of the Bouches-du-Rhône, France, have invented a new and useful Improvement in or Connected with Steam-Generators, (for which I have obtained Letters Patent in France, No. 227,055, dated January 14, 1893, and in Belgium, No. 105,555, dated July 15, 1893,) of which the following is a specification.

This invention relates to means for insuring a rapid circulation of the water in contact with the heated surfaces or plates of the boilers or steam-generators of all descriptions.

The apparatus employed according to this invention has no moving parts and its action is produced and regulated automatically and solely by the generation of the steam, as hereinafter explained.

The apparatus is based upon the utilization of the action of a current of steam and water, for example, both being at the same temperature, in which current, when caused to ascend in a small tube, the bubbles of steam, notwithstanding their small density, do not pass through the water and do not escape, except by driving before them the layers or pistons of liquid situated between them.

In order to cause the water to circulate in a steam-generator, according to this invention, one or more series of tubes of small diameter is arranged vertically in the interior of the boiler or generator and in a suitable position, as hereinafter described, their upper extremities communicating with the steam space in the upper part of the generator, and having their lower ends situated below the level of the main body of water in the boiler in a part forming a bell or steam-collector. The lower orifices of the tubes or series of tubes being situated at the level of the surface of the body of water in the bell, the series of tubes is traversed by a mixture of drops of water and bubbles of steam. The latter drive the drops of water before them, and thus insure a very rapid circulation. A screen or deflecting-plate can be arranged above the tubes if required. A passage for the return of the water must always be provided outside the mixing-tubes in order to conduct back to the lower part of the boiler the water which has passed through the tubes. This return-passage exists or is already provided for in most boilers. The said tubes are arranged in the interior of the heater and are entirely surrounded by water and steam, whereby they are not subjected directly to the flames or the furnace-gases, and are thereby prevented from being burned out or damaged by excessive heat.

In order that the said invention may be fully understood, I shall now proceed more particularly to describe the same, and for that purpose shall refer to the several figures on the annexed sheet of drawings, the same letters and numerals of reference indicating corresponding parts in all the figures.

Figure 3:
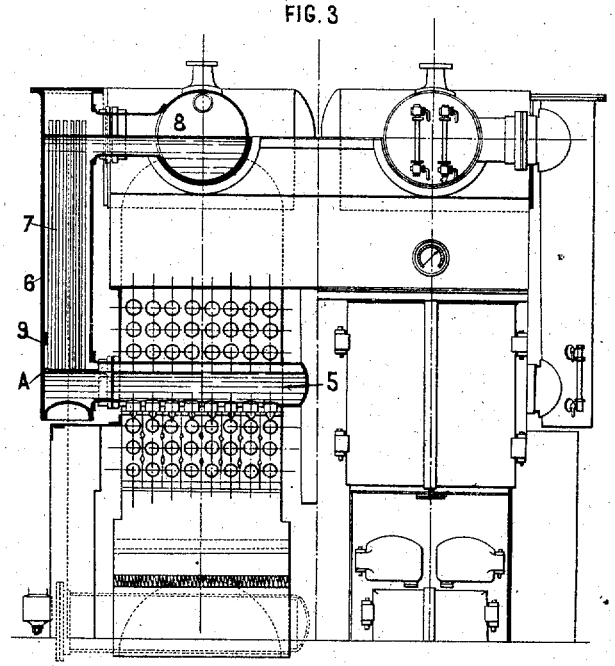
Figure 7:
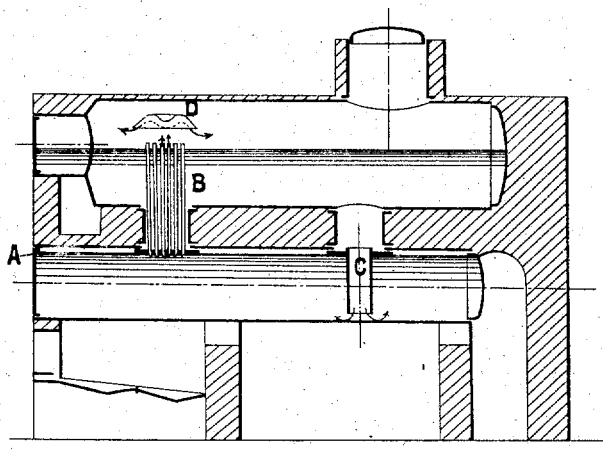
Figure 8:
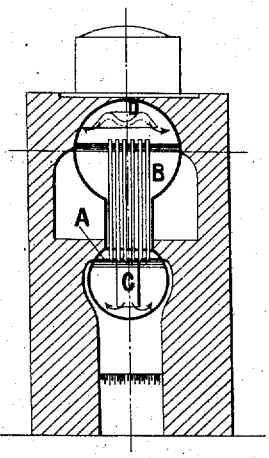
Figure 2:
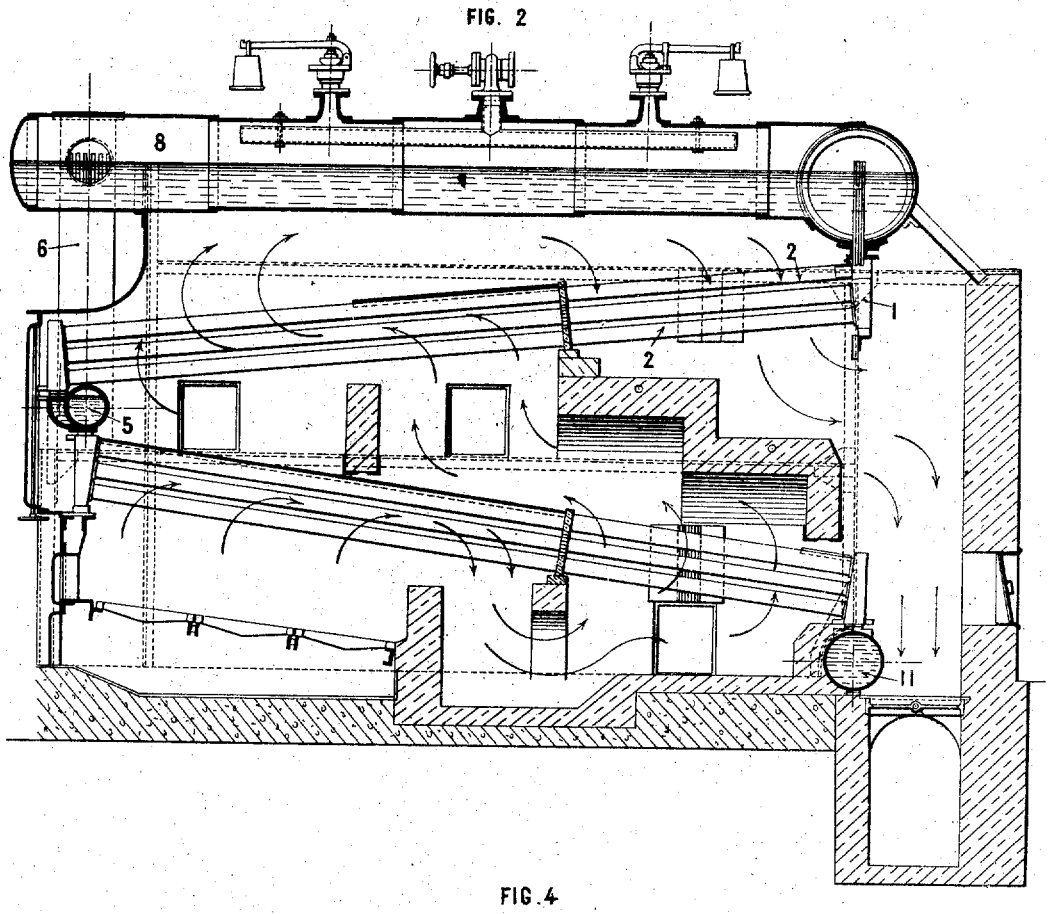
Figure 4:
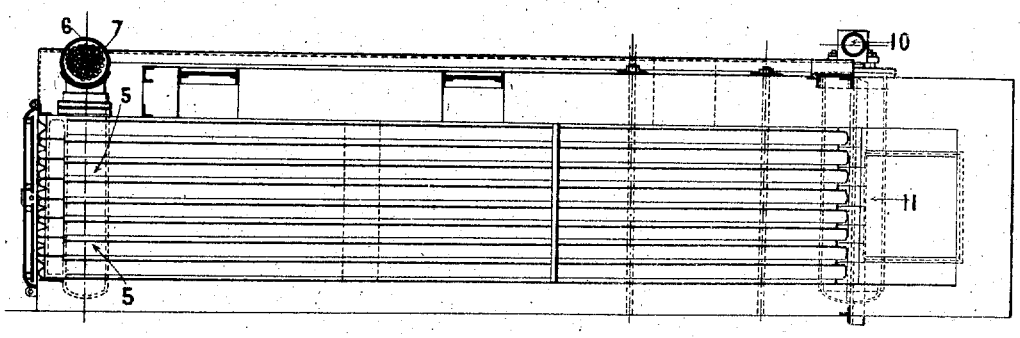
Figure 5:
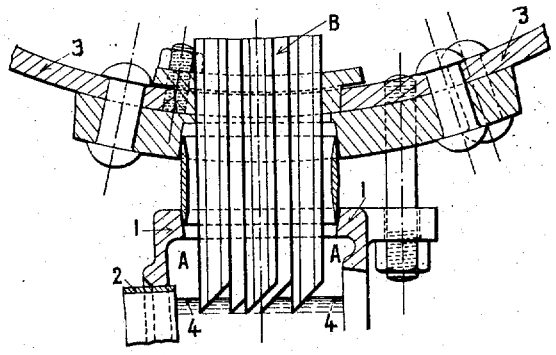
Figure 6:
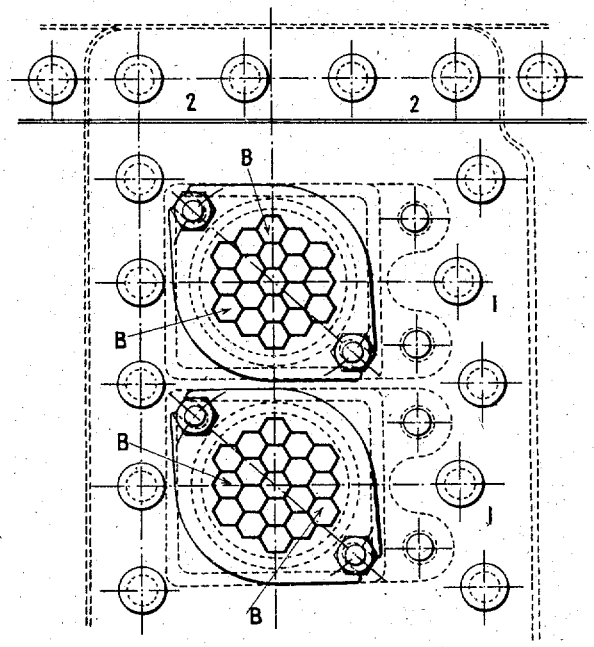

Figure 1 of the accompanying drawings is a diagram illustrating the principle of the invention. Fig. 2 illustrates in longitudinal section a special type of tubular boiler provided with mixing-tubes according to this invention. Fig. 3 illustrates the same boiler, partly in transverse section and partly in end elevation. Fig. 4 represents the boiler in horizontal section, showing one of the series of mixing-tubes and the normal return or reflux of water in the boiler. Fig. 5, drawn to a larger scale, illustrates a detail of the fitting of the mixing-tubes as arranged in the upper part of a boiler analogous to that represented in Fig. 2. Fig. 6 illustrates this arrangement in plan, the tubes being of angular or hexagonal form in section in order that they may occupy as little space as possible. Figs. 7 and 8 illustrate in longitudinal and transverse section, respectively, a boiler with a water-chamber provided with a mixing apparatus according to this invention.

As represented in Fig. 1, the apparatus is provided with a steam-collector or bell A, arranged below the normal level of the water and receiving in its upper part a portion of the steam which is generated underneath it.

B is a series of mixing-tubes consisting of tubes of small diameter passing through the upper part of the bell A, to which they are connected by a water-tight joint. The upper ends of the tubes are situated above the level of the main body of liquid in the boiler. Directly the steam is generated it accumulates and forms a layer in the upper part of the bell A and drives out a portion of the water until the level of the water—that is to say, the division between the steam and the water in the bell—has been brought down to the level of the lower ends of the tubes. The lower extremities of the tubes being preferably cut or formed at an angle or obliquely, as represented in the drawings, they are gradually uncovered and a mixture of water and steam is blown up and passes through the tubes. The mixture and circulation of the water are thereby caused to take place in a continuous manner, the water returning to the bell in the direction indicated by the arrows C.

A screen D may be arranged above the series of tubes in order to facilitate the separation of the water from the bubbles of steam, but this screen is not indispensable to the working of the apparatus, as the bubbles of steam do not become very intimately mixed with the plugs or pistons of water which they drive before them, and the separation takes place naturally or spontaneously. The upper ends of the tubes are arranged in the same horizontal plane, so that the discharge takes place from all the tubes simultaneously.

As an example illustrating the practical application of the invention, I will now proceed to describe it in detail as applied to a sectional boiler constructed with a number of water-tubes, as represented in Figs. 2 to 6 of the accompanying drawings.

In the upper part of a box or case 1, Fig. 2, connected with the upper ends of the main water-tubes 2, is arranged a series of vertical tubes B, passing through the bottom 3 of the upper chamber of the boiler. These tubes are represented as being of hexagonal form, and their lower extremities are preferably cut obliquely, as represented in Fig. 5. In this arrangement the upper part of the chamber 1 acts in the same way as the bell or steam-collector A, Fig. 1, and the division between the steam and the water is formed in this chamber in the plane 4, Fig. 5, so that the excess of steam in the chamber drives a portion of the water up the tubes B.

As represented in Fig. 6, the mixing apparatus is formed in this instance by two series of tubes. The type of boiler illustrated in Figs. 2, 3, and 4 has been selected in order to show that the mixing or circulating tubes may be arranged in different parts of the boiler. With this object an intermediate water-chamber is provided at 5 between the two clusters of water-tubes and communicates at its extremity with a chamber 6, containing a series of mixing or circulating tubes 7, communicating with the upper chamber 8 of the boiler. This second mixing or circulating apparatus acts in the same way as the first, and the bell A is formed in this case by a water-tight joint or partition 9, Fig. 3, by which the tubes 7 are supported in the chamber 6. A continuous circulation of the water is provided for by means of a return-tube 10, Fig. 4, which conducts the water to the lower part of the boiler or to the lower collector or water-chamber 11. A return-pipe of this description is provided in almost all kinds of boilers.

Figs. 7 and 8 illustrate the arrangement of the mixing or circulating apparatus in a boiler with a water-chamber arranged underneath the main body of the boiler. In this case the bell or steam-collector is formed by the upper part of the lower water-chamber, and the water in circulation, after ascending through the mixing-tubes, returns to the lower part of the water-chamber through a tube C, as represented by the arrows.

It is unnecessary to illustrate other examples of the application of the invention, the foregoing explanation being sufficient to enable the apparatus to be applied to any other type of boiler, whether provided with water-chambers, as in the case of elephant-boilers, or not, as well as to fixed or portable tubular boilers, for example.

Having now particularly described and ascertained the nature of the said invention and in what manner the same is to be performed, I declare that what I claim is—

1. In a steam-generator, the combination with the boiler thereof, of a steam-collector arranged in said boiler below the normal water-level, and entirely surrounded by water and steam, and a series of vertical tubes leading from the upper portion of said collector to a point above the normal water-level in the boiler, substantially as described and for the purpose specified.

2. In a steam-generator, the combination with the boiler thereof, of a steam-collector arranged in said boiler below the normal water-level, and a series of vertical tubes arranged wholly within the boiler-heater and entirely surrounded by water and steam, the lower ends of said tubes dipping into the upper portion of said collector and the upper ends thereof extending to a point above the normal water-level in the boiler, substantially as described and for the purpose specified.

3. In a steam-generator, the combination with the boiler thereof, of a steam-collector arranged in said boiler below the normal water-level, and a series of vertical tubes arranged wholly within the boiler-heater and entirely surrounded by water and steam, the lower ends of said tubes being cut off obliquely and extending into the upper portion of said collector and the upper ends thereof extending to a point above the normal water-level in the boiler, substantially as described and for the purpose specified.

4. In a steam-generator, the combination with the boiler thereof, of a steam-collector arranged in said boiler below the normal water-level, a series of vertical tubes leading from the upper portion of said collector to a point above the normal water-level in the boiler, the lower ends of said tubes being cut off obliquely, substantially as described and for the purpose specified.

5. In a steam-generator, the combination with the boiler thereof, of an inverted-bell-shaped steam-collector located in said boiler below the normal water-level, and a series of tubes leading from the upper portion of said steam-collector to a point above the normal water-line in the boiler, the lower ends of said tubes being cut off obliquely, substantially as described and for the purpose specified.

6. In a steam-generator, the combination with the boiler thereof, of a steam-collector arranged in said boiler below the normal water-level, a series of hexagonal-shaped vertical tubes arranged as shown and leading from the upper portion of said collector to a point above the normal water-level in the boiler, the lower ends of said tubes being cut off obliquely, substantially as described and for the purpose specified.

In testimony whereof I have signed this specification in the presence of two subscribing witnesses.

PAUL DUBIAU.

Witnesses:
L. CAILLOL,
CHOME.